Aug. 16, 1932.  E. H. ELLMS  1,871,596
DEHYDRATION AND DISTILLATION OF TAR
Filed May 16, 1927
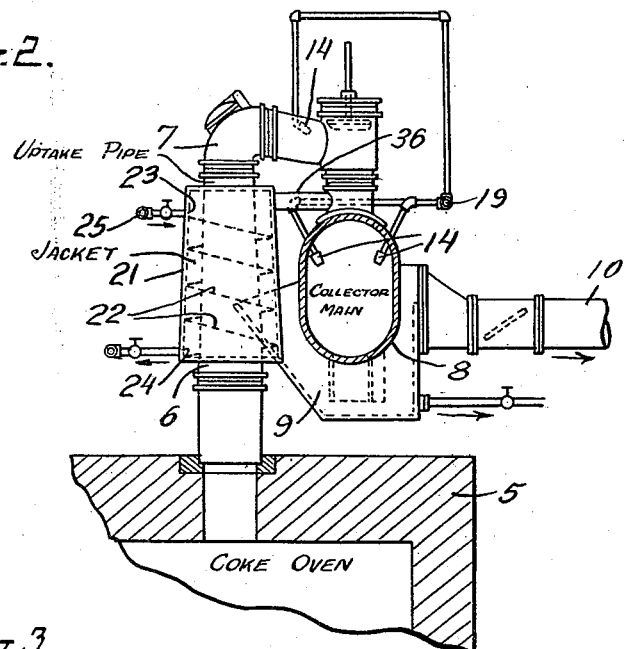
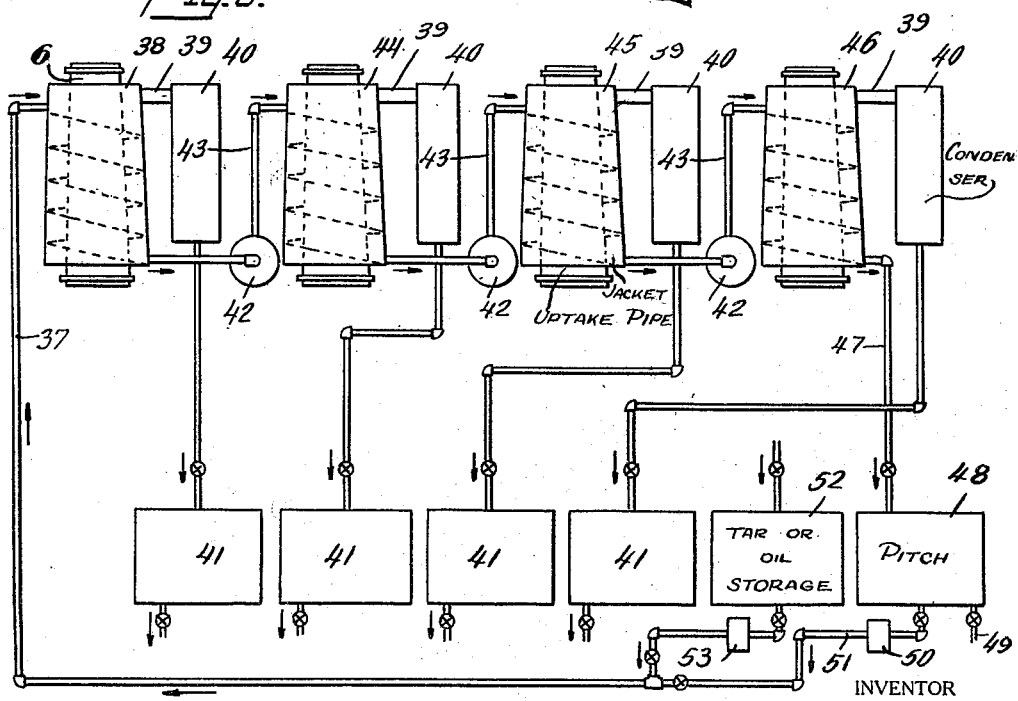
INVENTOR
Edward H. Ellms
BY
ATTORNEYS

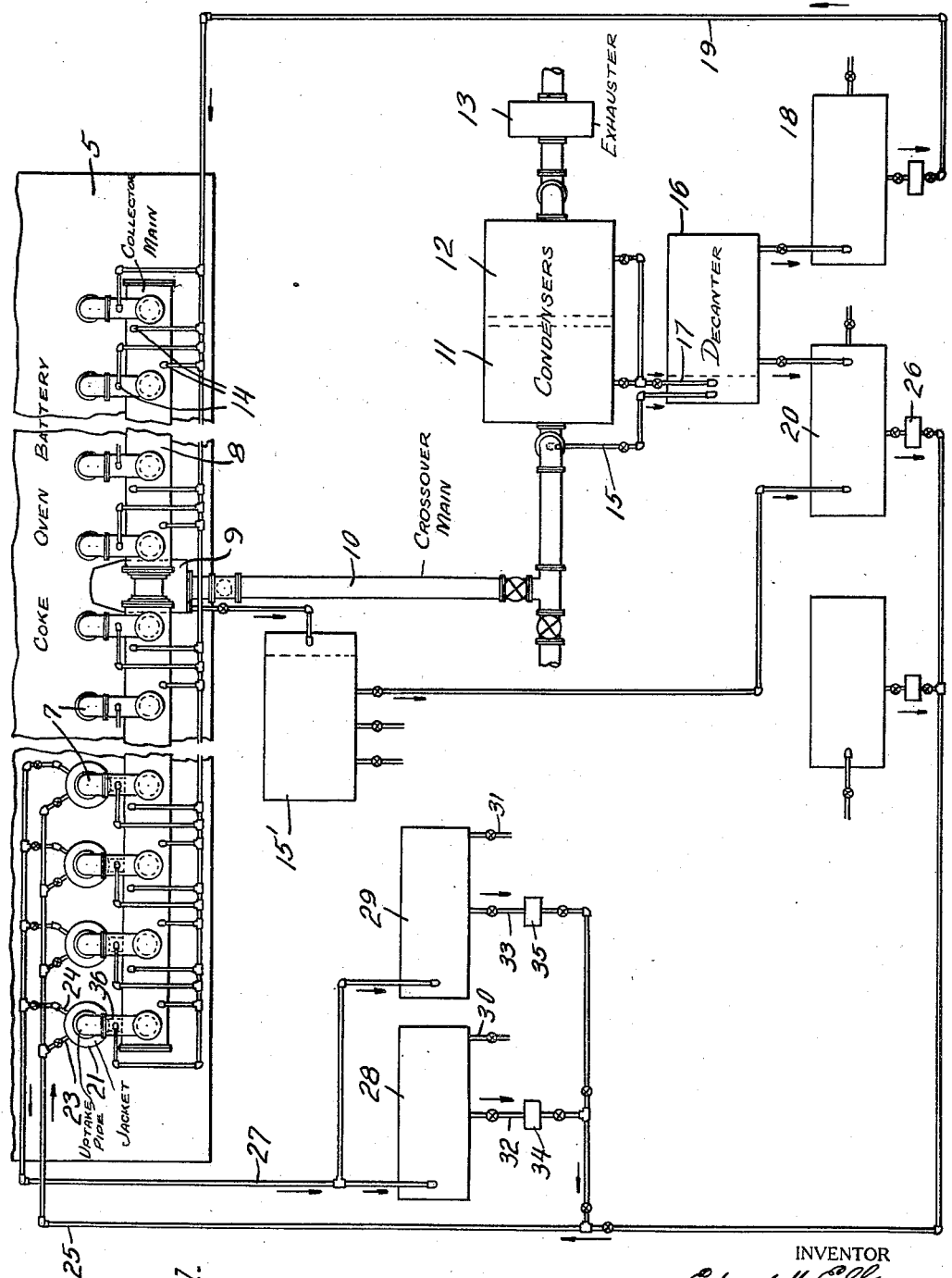

UNITED STATES PATENT OFFICE

EDWARD H. ELLMS, OF ENGLEWOOD, NEW JERSEY, ASSIGNOR TO THE BARRETT COMPANY, OF NEW YORK, N. Y., A CORPORATION OF NEW JERSEY

DEHYDRATION AND DISTILLATION OF TAR

Application filed May 16, 1927. Serial No. 191,580.

This invention relates to improvements in the dehydration and distillation of tar, oil and other products resulting from the carbonization of coal and includes a new method of distillation and apparatus therefor. The invention will be described more particularly with reference to the operation of by-product coke ovens.

In the ordinary operation of by-product coke ovens the gases produced by the coking operation pass from the individual ovens through uptake pipes and goose-necks to a collector main common to a battery of ovens. The coke-oven gases leaving the ovens at high temperature, e. g., 600° to 700° C. or higher, are normally cooled by the application of sprays of ammonia liquor or ammonia liquor and tar in the goose-necks and collector main to separate a portion of the tarry constituents. The gases are further cooled in condensers to separate additional quantities of tar and oil. These products are usually shipped to tar-distillation plants where they are subjected to distillation for the recovery of coal-tar distillates and the production of pitch as a residue of the distillation. The expense of shipping the tar and of providing the necessary heat for the distillation thereof in separate plants adds materially to the cost of the distillation products.

The tar which is recovered in by-product recovery plants usually contains a considerable proportion of water because of the common use of ammonia liquor as a cooling agent for the gases. The presence of water sometimes causes foaming and other difficulties in the distillation operation, thus necessitating the provision of separate heating and dehydrating units.

It is the particular object of the present invention to provide a method and apparatus whereby tar and similar products may be dehydrated economically by means of hot gases from the coal-distillation operation and distilled or partially distilled if desired to separate vaporizable constituents therefrom.

According to the present invention the coke ovens and the usual by-product recovery plant are operated in the usual manner, that is to say, the hot gases are delivered through the usual uptake pipes and goose-necks to a common collector main and are subjected in the goose-necks and collector main to the cooling effect of sprays of ammonia liquor or ammonia liquor and tar whereby the gases are cooled and the tarry constituents are more or less separated from the gases. The gases are conducted through a cross-over main to condensers wherein they are further cooled for the separation of oils. The tar and oils are delivered to a decanter wherein the ammonia liquor is separated therefrom. The ammonia liquor can be returned for further use as a cooling agent or it may be treated otherwise for the separation of ammonia therefrom.

The present invention involves the utilization of the heat of the gases delivered from selected ovens of the battery to dehydrate or to dehydrate and distill the tar and oil produced by the battery or tar and oil or other products derived from other sources. In carrying out the invention the products to be dehydrated or distilled are conducted through a heating zone in indirect contact with the hot gases from selected ovens of the battery as the gases pass through the uptake pipes leading therefrom. The temperature of the gases is thus reduced and at the same time the temperature of the tar or oil or other product is raised to the point at which the water and more or less of the volatile oil constituents are vaporized. The volatilized portion may be separated from the tar or oil in the heating zone and delivered to the collector main or to separate condensers wherein the vapors are cooled and condensed. The heated tar or oil may be withdrawn continuously or intermittently and, depending upon the amount of heating to which it has been subjected, will be dehydrated tar or partially distilled tar or pitch.

The amount of heating to which the tar or oil is subjected may be varied readily by modifying the rate of flow of the tar through the heat-exchange apparatus and by combining two or more heat exchangers so that the tar or oil is subjected successively to the heating effect of the gases from a series of ovens. Thus, the invention may be employed for dehydrating tar or oil by subjecting it to only a limited amount of heating, for example, by passing it through a single exchanger, or the tar or oil may be dehydrated and distilled by exposing it for a longer period to the heat of the coke-oven gases, for example, by passing it through a series of heat exchangers. The amount of distillation and the quality and characteristics of the products will depend upon the amount of heating to which the tar or oil is subjected. Any number of heat exchangers may be provided and utilized when desired to heat the tar to the extent required for the purpose in view.

The heat exchangers may be constructed in various forms and in different ways. A simple form of exchanger includes a jacket surrounding the uptake pipe with a spiral rib therein forming a passage from the top to the bottom of the jacket through which the tar or oil may be permitted to flow in indirect heat-exchange relation with the hot coke-oven gases passing through the uptake pipes. The heat may be transferred effectively through the wall of the uptake pipe to the tar circulating through the jacket and the tar may be heated thus to the temperature required to volatilize moisture and more or less of the volatile constituents of the tar or oil. The amount of heating effected in a single jacket will depend upon the rate of flow of the tar therethrough and the conductivity of the heated wall with which it is in contact. By arranging a number of such jackets surrounding the uptake pipes of a plurality of ovens and by directing the tar or oil through such jackets in succession, the heating of the tar or oil to any temperature which is necessary for the distillation of volatile constituents therefrom can be readily accomplished. The tar can be conducted through a series of such jackets, the vapors being separated therein and delivered either to the collector main where they mingle with the coke-oven gases or withdrawn and condensed in a separate condensing system. The tar or pitch, after the required amount of heating, can be withdrawn from the jackets and utilized for any desired purpose.

The heat available in the gases escaping from all of the ovens of a coke-oven battery is many times the amount required to distill all of the tar produced by that battery. Consequently if only the tar from the battery is to be distilled a limited number of jacketed uptake pipes will suffice for the dehydration and distillation of the tar. The invention may be utilized, however, for the dehydration and distillation of tar from other sources such, for example, as gas-retort tar, vertical-retort tar and water-gas tar. Such tars can be distilled independently by circulating them through the jacketed uptake pipes in the manner hereinbefore described to produce separate and distinct products. Such operation is particularly desirable in the case of certain tars such, for example, as gas-retort tar which contains a relatively high free carbon content. The dehydration and distillation are carried out without direct contact with the hot coke-oven gases and consequently contamination of the tar being distilled with coke-oven tar is avoided. Various tars and oils can be mingled, however, and dehydrated and distilled in the jacketed uptake pipes. Thus, coke-oven tar can be mixed with gas-retort tar in any desired proportion to produce a blended product having a higher free carbon content than the normal content of coke-oven tar.

The operations as described can be conducted intermittently or continuously as desired. When distillation is not required the tar or oil can be blown from the jacketed uptake pipes with steam and steam or ammonia liquor can be circulated thereafter through the jackets until such time as the distillation of tar or oil is resumed. This will prevent the coking of tar or pitch in the jackets and the consequent stoppage thereof.

While the invention is designed primarily for the dehydration and distillation of tar and oils, it will be understood that other liquids and even gases may be circulated through the jackets for the purpose of heating such liquids and gases. Thus, water may be circulated through the jackets to produce hot water or steam required for any purpose, and air or any other gas may be likewise circulated through the jackets to raise the temperature of the air or gas to the desired extent. In either case the gases escaping through the uptake pipes will be cooled correspondingly and the cooling normally effected in the goose-necks and collector main may be reduced accordingly with respect to such gases. The invention may be used likewise for preheating any liquid, for example, to preheat tar or oil which is to be distilled in another apparatus.

Preferably in the operation of the invention the tar or oil is conducted through the jacket in such a way as to permit the return of the vapors separated therefrom in a counter-current direction. The vapors may, however, be withdrawn with the tar or oil and separated therefrom in a vapor box or separator provided for that purpose. The vapors when released and separated from the tar or oil may be cooled and thus condensed to recover the volatile constituents.

The invention as described is of general application to the dehydration and distillation of tars and oils including dehydration and distillation of dirty oils for the purpose of producing clean distillates therefrom. It will be further illustrated by the following more detailed description in connection with the accompanying drawings which show apparatus embodying the invention and adapted for the practice of the process, but it is intended and will be understood that the invention is illustrated thereby and not limited thereto. In the drawings Fig. 1 is a plan view of a portion of a coke-oven plant illustrating the application of the invention thereto;

Fig. 2 is an enlarged sectional view of a jacketed uptake pipe showing the connection to the collector main; and Fig. 3 is an elevation of a portion of the coke oven battery illustrating the application of a plurality of jacketed uptake pipes in series.

Referring to the drawings, 5 indicates a battery of coke ovens which are connected through uptake pipes 6 and goose-necks 7 to a collector main 8 having a centre box 9. The collector main communicates with a cross-over main 10 which delivers the gases to condensers 11 and 12. The gases pass thence to an exhauster 13 and are delivered to the usual apparatus (not shown) for the separation of light oils, etc. The gases may be cooled by the application of ammonia liquor or ammonia liquor and tar through the spray nozzles 14 in the goose-necks and collector main. The tar which separates in the collector main may be drawn off into the decanter 15' and that which separates in the cross-over main may be delivered by a pipe 15 to a decanter 16 in which it is separated from ammonia liquor. The tar and oils condensed in the condensers 11 and 12 may be delivered by a pipe 17 to the decanter 16. The separated ammonia liquor may be delivered to a tank 18 and returned through a pipe 19 to the spray nozzles 14. The tar may be delivered to a tank 20 wherein it is stored for dehydration or distillation.

In carrying out the present invention a number of the uptake pipes 6 may be provided with jackets 21 which surround the uptake pipes and are provided with internal spiral ribs 22 forming spiral passages for the tar or oil to be dehydrated or distilled. The tar or oil may be introduced through an inlet 23 to each jacket and after flowing through the spiral passage therein in contact with the heated wall of the uptake pipe it may be withdrawn through an outlet 24. The tar or oil may be supplied, for example, through a pipe 25 from the tank 20, a pump 26 being provided to ensure the desired rate of flow of the tar through the dehydrating apparatus. The dehydrated or partially distilled tar may be withdrawn through a pipe 27 to tanks 28 or 29 from which the product may be withdrawn as required through outlets 30 and 31. It may be recirculated, if desired, through pipes 32 and 33 and pumps 34 and 35 which introduce the dehydrated and partially distilled oil to the pipe 25 for recirculation through the connected jacket.

The vapor which separates from the tar during its passage through the jacket normally returns counter-current thereto and may be delivered through a pipe 36 to the collector main 8. Each of the jackets may be thus connected to the collector main so that the vapors separated from the tar will enter the collector main and mingle with the coke-oven gases therein, being carried with the gases through the condensing system in the manner hereinbefore described. The pipe 36 may be closed and the jacket may be connected instead to a suitable separate condenser wherein the vapors may be cooled and condensed or the vapors may be withdrawn with the tar or oil through the pipe 27 and delivered to the tank 28 which, acting as a vapor box or separator, will permit the separation of the vapors from the tar or oil. The vapors may be withdrawn through a suitable outlet and delivered to a condenser.

In carrying out the invention the jacketed uptake pipes may be arranged in series as indicated in Fig. 3, the remaining structure being substantially as hereinbefore described. The tar or oil to be dehydrated and distilled may be introduced through a pipe 37 to a jacket 38, the vapor being withdrawn through a pipe 39 and delivered to a condenser 40 and thence to a receptacle for the condensate 41. The tar or oil from the jacket 38 may be delivered through a pump 42 and pipe 43 to a second jacket 44 and thence in series through jackets 45 and 46 through similar pumps 42 and pipes 43. The vapors from each jacket may be withdrawn through pipes 39 and delivered to condensers 40 and thence to the receivers 41. The final product, consisting of partially distilled tar or pitch, may be delivered through a pipe 47 to a pitch receptacle 48 from which it may be withdrawn through an outlet 49 or recirculated through a pump 50 and pipe 51. The tar or oil to be distilled can be stored in a tank 52 and delivered by a pump 53 to the pipe 37 leading to the first jacket of the series. It will be understood that two or more series of jackets may be operated in parallel and that any other suitable arrangement can be made to permit the desired heating of the tar, oil or other product in the apparatus.

While I have described and illustrated a particular type and construction of a jacketed uptake pipe which can be employed advantageously with ovens of present construction in place of the ordinary uptake pipe, it is evident that the invention in its broader aspects can be carried out in apparatus of modified construction and that various changes can be made, therefore, in the form and arrangement of the apparatus and in the mode of operation thereof without departing from the invention or sacrificing any of its advantages.

I claim:—

The method of distilling tar continuously, which comprises bringing tar into indirect countercurrent heat exchange relation with hot coke oven gases directly as they rise from a coke oven, thereby heating the tar above the boiling point of lower boiling constituents, separating the vapors of such lower boiling constituents during the heating operation and thereafter condensing the vapors.

In testimony whereof I affix my signature.

EDWARD H. ELLMS.